US 6,819,487 B2

(12) United States Patent
Palovuori et al.

(10) Patent No.: US 6,819,487 B2
(45) Date of Patent: Nov. 16, 2004

(54) METHOD AND APPARATUS FOR FORMING A PROJECTION SCREEN OR A PROJECTION VOLUME

(76) Inventors: Karri Palovuori, Linnainmaanraitti 18 A 5, FIN-33580 Tampere (FI); Ismo Rakkolainen, Luolakatu 4 A 6, FIN-33710 Tampere (FI)

( * ) Notice: Subject to any disclaimer, the term of this patent is extended or adjusted under 35 U.S.C. 154(b) by 0 days.

(21) Appl. No.: 10/466,341
(22) PCT Filed: Jan. 15, 2002
(86) PCT No.: PCT/FI02/00026
§ 371 (c)(1), (2), (4) Date: Nov. 20, 2003
(87) PCT Pub. No.: WO02/056111
PCT Pub. Date: Jul. 18, 2002

(65) Prior Publication Data
US 2004/0080820 A1 Apr. 29, 2004

(30) Foreign Application Priority Data
Jan. 15, 2001 (FI) .............................. 20010085

(51) Int. Cl.⁷ .......................... G03B 21/56; G03B 21/26
(52) U.S. Cl. ........................................ 359/443; 353/28
(58) Field of Search ............................... 359/443, 446, 359/460; 353/28, 122; 239/18

(56) References Cited

U.S. PATENT DOCUMENTS

| 1,631,240 A | * | 6/1927 | Amet .......................... 359/443 |
| 3,334,816 A | * | 8/1967 | Mizuno ........................ 239/18 |
| 4,401,368 A | | 8/1983 | Dreschsel et al. .......... 359/452 |
| 4,955,540 A | | 9/1990 | Fuller et al. ................ 239/20 |
| 5,067,653 A | | 11/1991 | Araki et al. ................. 239/18 |
| 5,265,802 A | | 11/1993 | Hobbs et al. ................ 239/18 |
| 5,270,752 A | | 12/1993 | Kataoka et al. ............. 353/28 |
| 5,989,128 A | | 11/1999 | Baker et al. ................ 472/65 |
| 6,092,900 A | | 7/2000 | Diedrich et al. ............ 353/122 |
| 2004/0001182 A1 | | 1/2004 | Dyner |

FOREIGN PATENT DOCUMENTS

| CH | 647605 | 1/1985 |
| DE | 476372 | 5/1929 |
| DE | 3130638 | 2/1983 |
| FR | 2773229 | 7/1999 |
| GB | 2220278 | 1/1990 |
| JP | 7056235 | 3/1995 |

* cited by examiner

Primary Examiner—Christopher E Mahoney
(74) Attorney, Agent, or Firm—Venable LLP; Eric J. Franklin

(57) ABSTRACT

The invention relates to a method for producing a non-solid projection screen (3), projection volume (8), or the like, the method comprising the steps of supplying and/or forming light scattering/reflecting scattering centres (4) to a substantially laminar transfer flow (2) to be transferred by said transfer flow (2). In accordance with the invention, the scattering centres (4) are supplied and/or formed to the transfer flow (2), to the central/inner parts thereof that remain laminar, away from the direct vicinity of the interfaces between the transfer flow (2) and the area surrounding thereof, in order to keep the projection screen in shape. In accordance with the invention, as the scattering centres (4) can be used light elastically or non-elastically scattering, solid liquid or gaseous substance.

29 Claims, 5 Drawing Sheets

METHOD AND APPARATUS FOR FORMING A PROJECTION SCREEN OR A PROJECTION VOLUME

Figure 1:
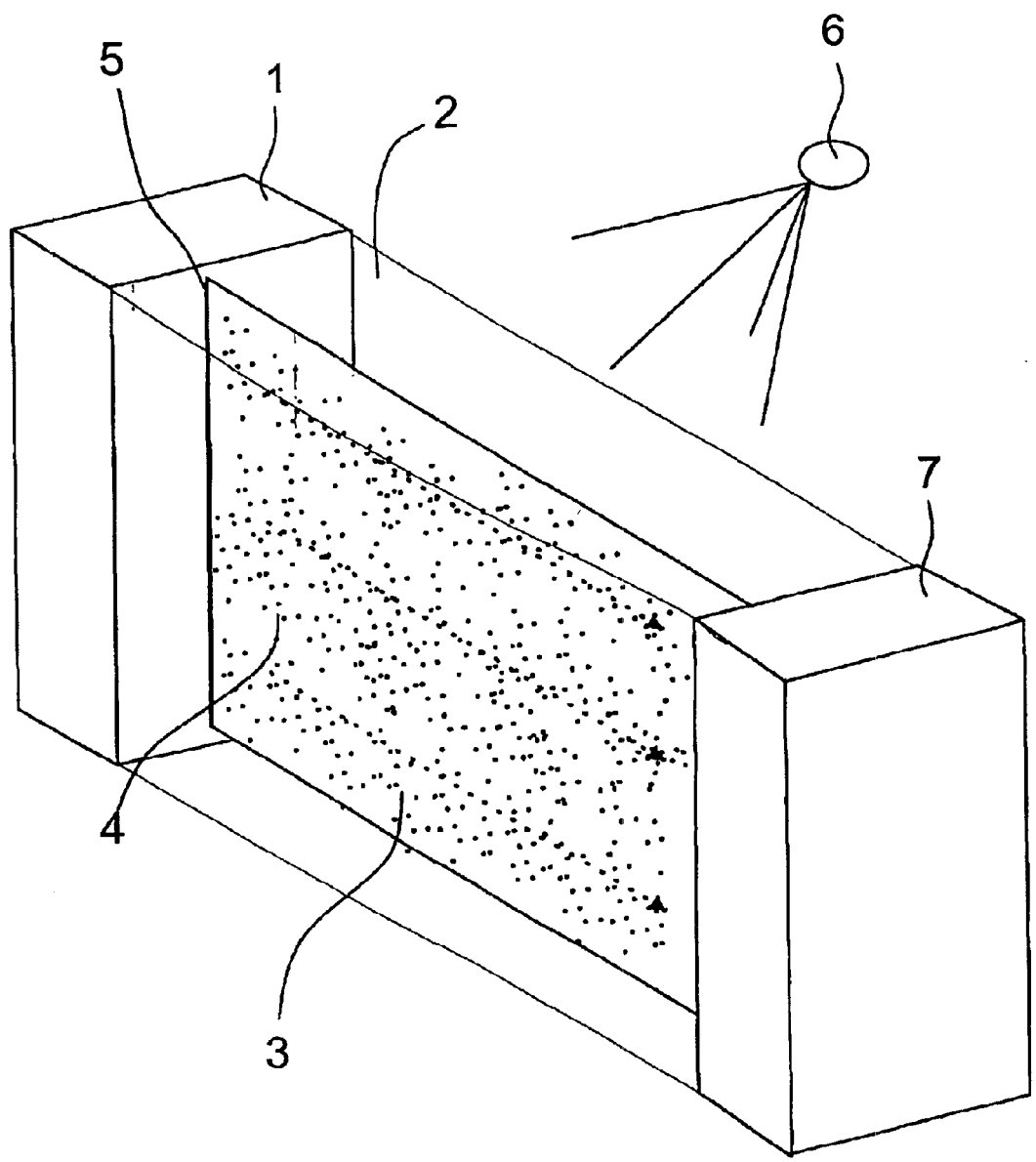

The present invention relates to a method for forming a projection screen or a projection volume. The invention also relates to a device for implementing the aforementioned method.

In this context, a projection screen refers generally to a substantially two-dimensional surface with such light reflection and/or light scattering properties that a moving or still image, or other performances or effects based on the use of light, can be reflected on the surface by means of a projector, light effect device, laser device, or the like. In a corresponding manner, a projection volume refers to a substantially three-dimensional object that can be illuminated in a suitable manner to produce three-dimensional patters.

The most commonly used projection screens are manufactured of fabric, painted wood, metal, plastic, or other solid material. A well-known example of such a solid projection screen is the movie screen.

However, using the above-mentioned projection screens involves certain limitations. For example, in different outdoor or indoor performances, large, temporary projection screens are needed, which must be assembled and disassembled fast. In certain situations, assembling and disassembling the projection screens must be carried out also during an actual performance. The prior art recognizes various non-solid projection screens that enable more versatile uses compared to traditional solid projection screens.

U.S. patent publications U.S. Pat. No. 5,067,653, U.S. Pat. No. 5,270,752, U.S. Pat. No. 5,989,128 U.S. Pat. No. 6,092,900, German patent publications DE 476372 and DE 3130638, Swiss patent publication CH 647605, British patent publication GB 2220278, and French patent publication FR 2773229 describe various projection screens formed typically of fog. They generally describe spraying of fog or steam condensating into fog, or gas planarly from nozzles, wherein images, or the like, can be projected on the thereby generated planar fog surface either from the front of the projection screen or from the back of the projection screen relative to the observer.

A problem involved in these projection screens composed of fog, or the like, is their tendency to disperse, i.e., the planar quality of the projection screen deteriorates as the distance grows to the nozzles used in forming the projection screen. This is due to the friction caused by a fog flow of the surrounding still air and to the turbulence produced on the surface of the flow formed by the projection screen as a result of this. Obviously, as the planar quality of the projection screen deteriorates, the Image quality deteriorates respectively.

This problem is subject to discussion particularly in the aforementioned patents U.S. Pat. No. 5,067,653 and U.S. Pat. No. 5,270,752. In said patents, both sides of the projection screen are provided with air curtains, i.e. air flows that are parallel with the flow formed by the projection screen, wherein the task of these air curtains is to limit the fog flow between the air curtains as planar as possible.

Japanese patent publication JP7056235 introduces a different kind of solution for maintaining the planar quality of the projection screen. In the solution introduced in said patent publication the projection screen is formed by blowing fog or smoke from the nozzles in a manner that the resulting flow is initially laminar. To keep the flow better in shape, a separate suction apparatus is arranged on the opposite side relative to the nozzles to suck the flow forming the projection screen. An aim of this arrangement is to prevent dispersion of the flow caused by the projection screen on the stretch between the blow apparatuses and suction apparatuses.

However, in the aforementioned prior art solutions a significantly more complicated apparatus structure is needed in forming the projection screen, among other things, because separate air curtains are formed. Nevertheless, in spite of the air curtains and/or the separate suction apparatus, in practice the projection screen always disperses to some extent, thereby deteriorating the image quality. The projection screen tends to disperse more, the further away the distance to the nozzles grows. The larger projection screen is aimed to be produced, the more difficult it becomes also technically to obtain a planar projection screen.

Moreover, prior art methods are ill suited for producing other kind than merely planar projection screens. For example, steeply curved cylindrical projection screens are difficult to form. Prior art solutions are still mainly restricted to using fog (water) or smoke in forming the projection screen. Prior art is also unable to provide functional solutions for obtaining, in a satisfactory manner, projection volumes and three-dimensional patterns projected on them.

The main purpose of the present invention is to provide a novel method for forming a non-solid projection screen or projection volume in a manner that the problems present in the above-described prior art solutions can be reduced or totally prevented.

To attain this purpose, the present invention provides a method as described herein.

It is also an aim of the invention to provide a device implementing the aforementioned method.

The gist of the invention is to use a non-turbulent, i.e., laminar transfer flow that is composed of gas or liquid and is larger than the actual projection screen or projection volume, for moving the scattering centres forming the projection screen or projection volume. In accordance with the invention, the scattering centres are supplied inside said laminar transfer flow in a manner that the scattering centres move along with the flow in the central or inner part of the flow that remains laminar, without drifting to the vicinity of the interface between the transfer flow and the thereof surrounding area, there being always some flow-dispersing turbulence present in said interface. Since the turbulence occurring on the interface of the transfer flow does not reach the central or inner parts of said transfer flow to a significant degree, the flow conditions in the central or inner parts keep their laminar nature extremely well, wherein the flow of the scattering centres forming the projection screen or projection volume remains well in shape.

Because the transfer flow now contains in itself the scattering centres necessary for forming the projection screen or projection volume, separate air curtains, or the like, used in prior art methods are not required at all. Instead of the three flows (two air curtains and an actual flow forming the projection screen between these two) used typically in solutions of prior art, in the solution according to the invention only one flow containing the projection screen in, Itself is required.

As the transfer flow is composed mainly of gas, advantageously of air, the scattering centres can be, for example, aerosol particles in fluid or solid form, such as smoke, or steam. Certain gas molecules or atoms can also operate as scattering centres.

As the transfer flow is mainly composed of transparent fluid, for example water, the scattering centres can be, besides small particles of solid material, also such larger particles that can move along the fluid flow that carries them. Fluids or gas bubbles that are insoluble to the fluid of the transfer flow can also still operate as the scattering centres.

In one embodiment of the invention the scattering centres used are elastically light-scattering scattering centres, such as aerosol particles contained in smoke or fog, for example, or particles of solid material contained in fluid, or gas bubbles. In this case, the wavelength of the light scattered/reflected by the scattering centres is the same as the wavelength of the light that Illuminates them. Thus, the scattering process can be based, for example, on so-called Mie scattering, which refers to elastic light scattering that is generated from scattering centres that are larger in size relative to the wavelength of light. An advantage of this embodiment is that the projected image is easy to form in multi-colour, using conventional movie or video projectors, or the like.

In another embodiment of the invention, material is used that scatters light in a non-elastic manner, such as phosphorescent or fluorescent particles, molecules or atoms. Hence, the scattering centres are made to emit visible light by illuminating and activating them with suitable radiation having higher energy level, ie., radiation with shorter wavelength. A benefit with this embodiment is that since the light of a certain wavelength directed to the projection screen or projection volume, for example ultraviolet light that is invisible to the human eye, activates visible only certain defined areas in the target, this method can be used for forming images or three-dimensional patterns that seem to be floating in the air. Other areas of the projection screen or projection volume can be arranged, using suitable scattering centres, for example gas molecules, as scattering centres, to be substantially totally transparent in the prevailing surrounding normal light, i.e., invisible to the observer.

The solution of the invention enables forming of projection screens or projection volumes of scattering centres moving along a gas or fluid flow, the benefit of said projection screens or projection volumes being, among other things, that they take a thin and cohesive form and therefore show good image quality, that the apparatus required to form them is simple, light-weight and easy to move and use, that the projection screen and projection volume is very fast to form and disassemble, and that also other types of projection screens than planar ones can be formed.

The solution of the invention allows, while using, e.g., air for forming the transfer flow and so-called dry fog as the scattering centres, it is possible to create also walk-through projection screens and projection volumes useful for example in forming so-called virtual spaces and rooms (Projection-Based Virtual Environment, Cave Automatic Virtual Environment). The projection screen constructions of prior art virtual spaces are very expensive and difficult to form, assemble and amend. The method according to the invention is suitable also for creating various three-dimensional patterns, for three-dimensional visualisation, for producing special effects and/or staging in different indoor or outdoor scenes, or the like.

The following more detailed description of the invention by means of examples will more clearly illustrate, for anyone skilled in the art, advantageous embodiments of the invention as well as advantages to be achieved with the invention in relation to prior art.

Figure 2:
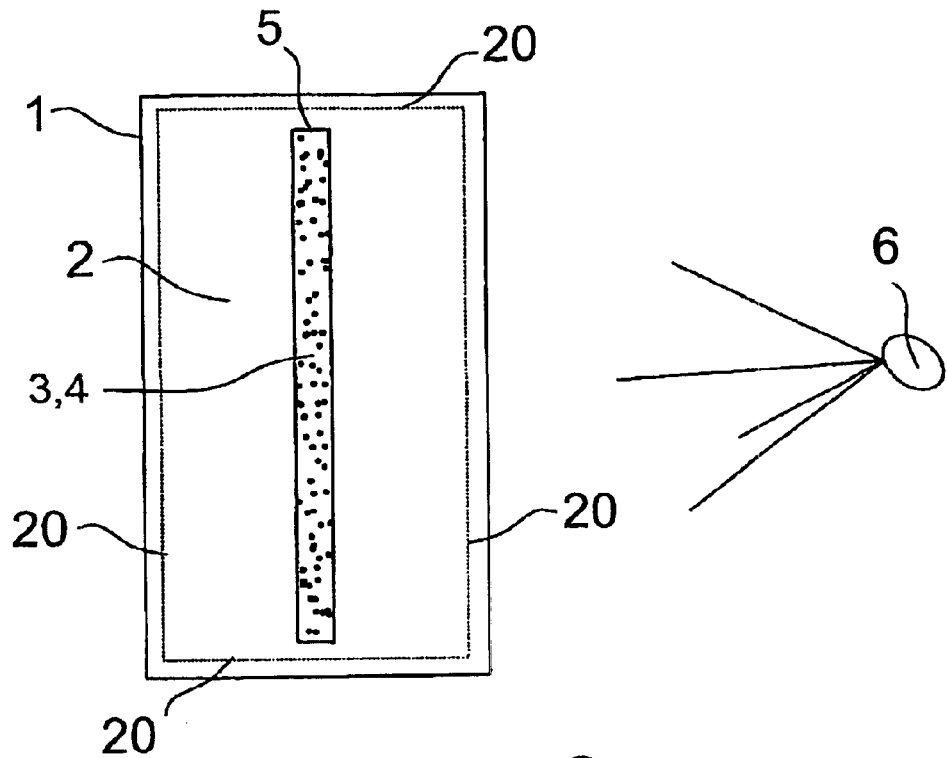
Figure 3:
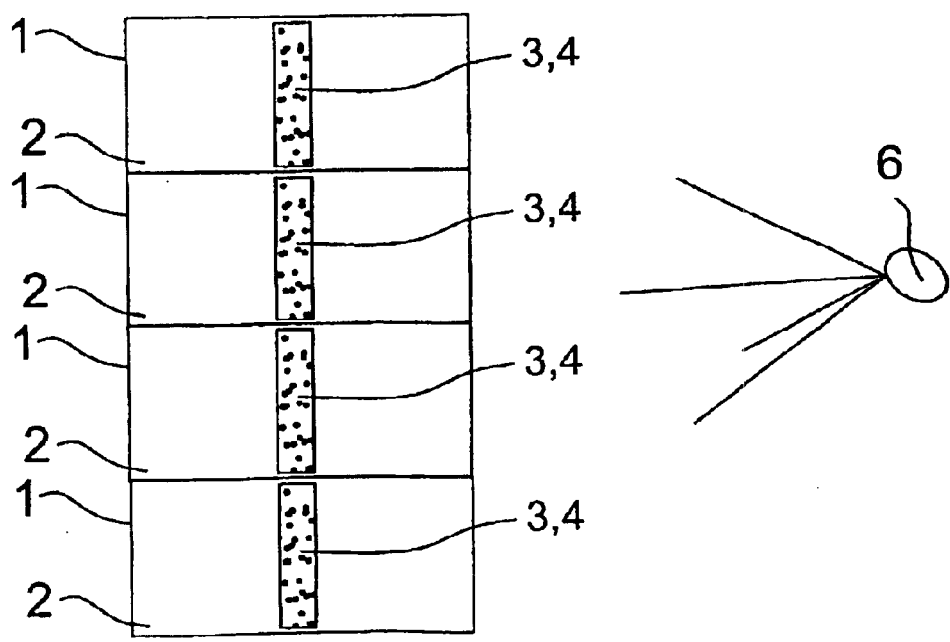
Figure 4:
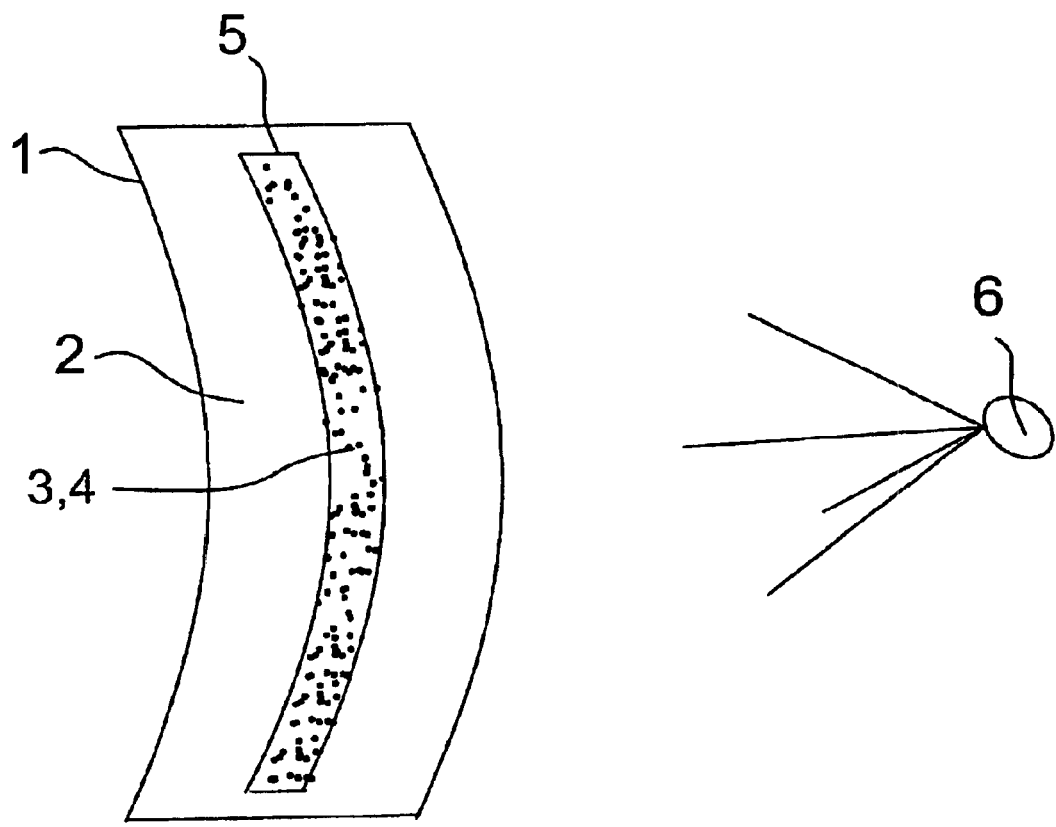
Figure 5:
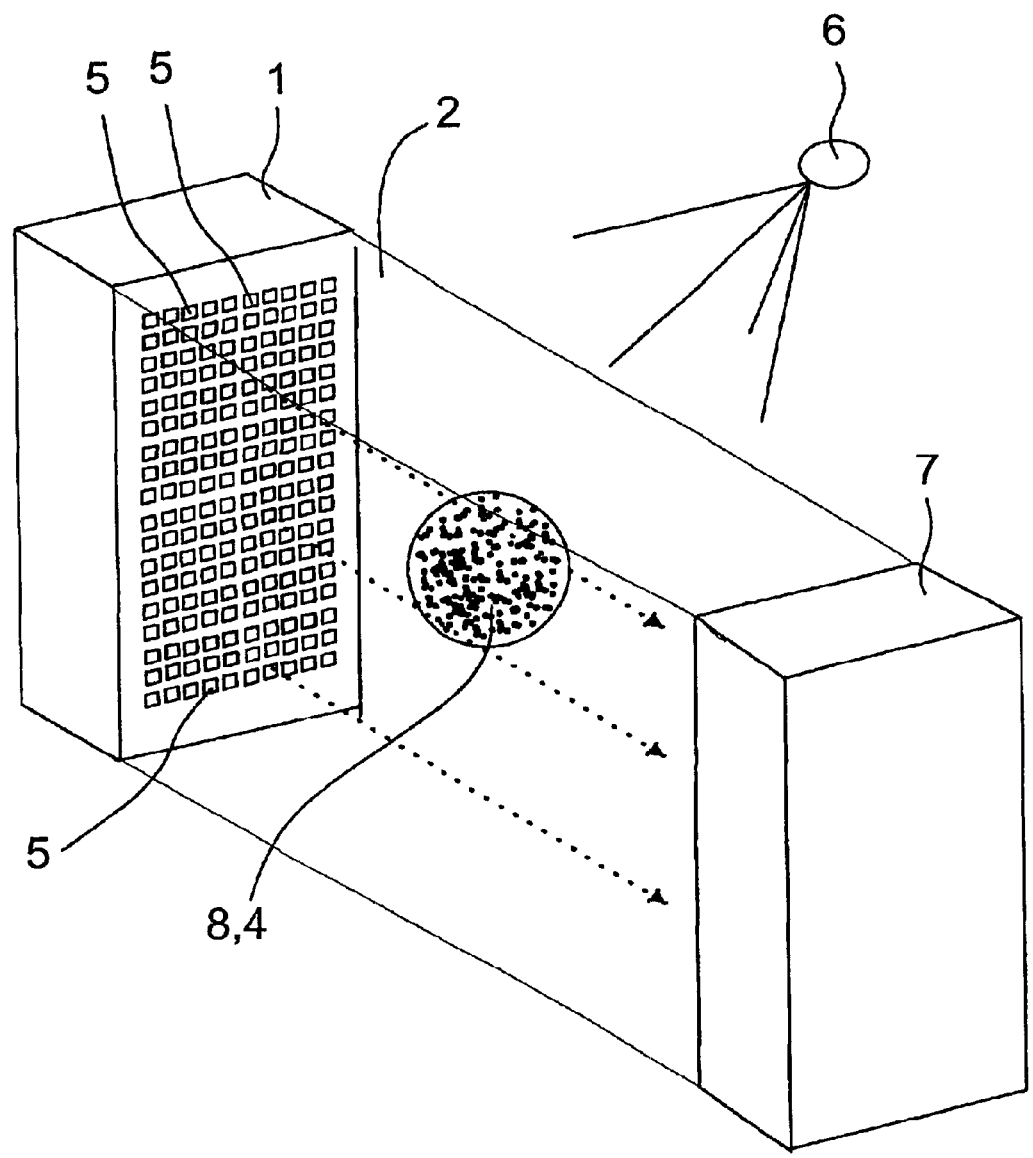
Figure 6:
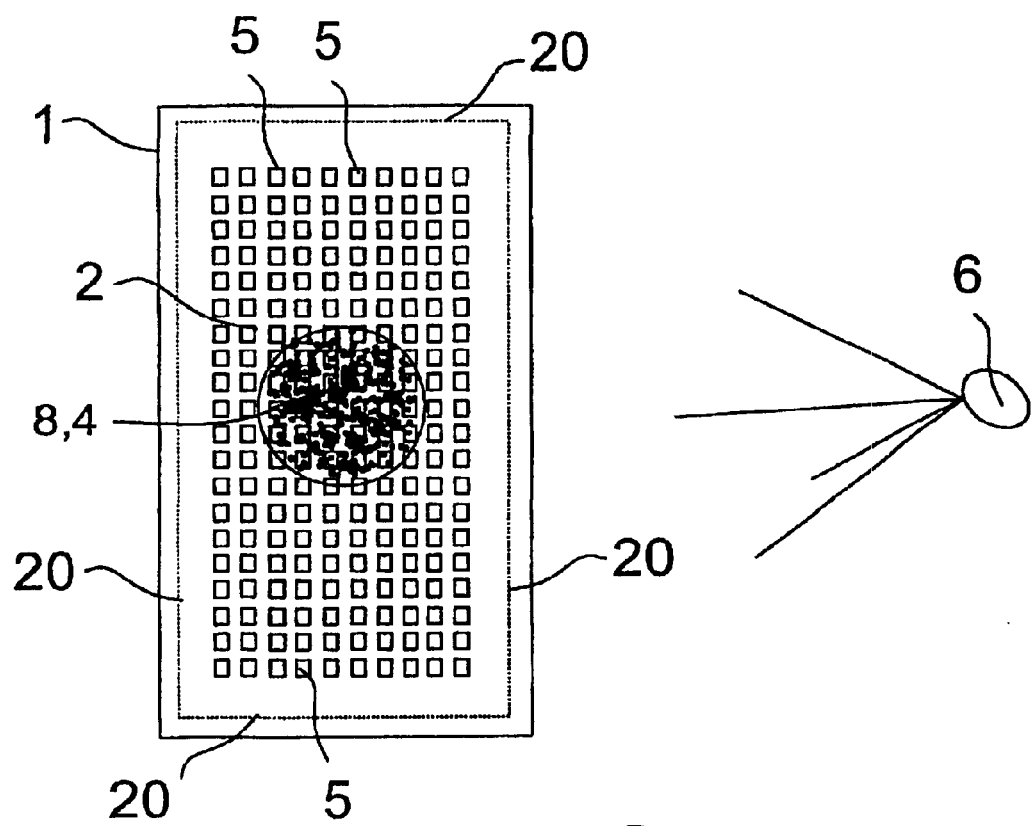

In the following, the invention will be described in more detail with reference to the appended drawings, in which FIG. 1 illustrates the basic principle of the invention in a perspective view when forming a substantially two-dimensional projection screen, FIG. 2 illustrates the embodiment according to FIG. 1 seen from a direction opposite to the flow direction of the transfer flow, FIG. 3 illustrates, in a manner corresponding to that of FIG. 2, a principle view of an embodiment of the invention, FIG. 4 illustrates, in a manner corresponding to that of FIG. 2, a principle view of a second embodiment of the invention, FIG. 5 illustrates, in a principle manner, the main principle of the invention in a perspective view upon creating a three-dimensional projection volume, and FIG. 6 illustrates the embodiment according to FIG. 5 seen from a direction opposite to the flow direction of the transfer flow.

FIG. 1 shows, in a principle manner, one apparatus according to the invention for forming a projection screen. To form a transfer flow 2 of gas or fluid as a substantially laminar, i.e., non-turbulence flow, any suitable solution that is obvious to an expert in the field as such can also be used. Principles of forming a laminar flow of gas or fluid are very well known from study books of flow technique, and are therefore not discussed here in more detail.

The projection screen 3 is formed of scattering centres 4 that are either discharged from a supply means 5 and/or formed of source mate rial/materials discharged from said supply means 5. The scattering centres 4 move inside a laminar transfer flow 2 in a manner that the scattering centres 4 move along the transfer flow 2 in the inner part of the transfer flow 2, which inner part remains laminar, without drifting to the vicinity of the interfaces between the transfer flow 2 and the area surrounding thereof, which interfaces always contain turbulence dispersing the transfer flow 2 to some extent. However, the inner parts of the transfer flow 2, being at a sufficient distance from the aforementioned interfaces, keep their flow readily in laminar form, wherein the projection screen 3 composed of scattering centres 4 remains, in turn, well in shape.

To form an image on the projection screen 3, a projector 6 projects light, which scatters from the scattering centres 4 in an elastic or nonelastic manner, forming the desired Image on the projection screen 3.

In the embodiments of the invention that are based on elastic scattering; such as the Mie scattering, for example, the projector 6 can be a movie projector, a video or computer projector, a luminous effect device, laser device or any other device by which the desired still or moving image and/or luminous effect could be projected also on an ordinary solid projection screen, such as movie screen, for example. In some embodiments of the invention the projector 6 can be also an illuminator, spotlight, or a corresponding non-imaging light source.

In the methods of the invention that are based on non-elastic scattering, such as fluorescence, for example, the projector 6 can be, for example, a so-called laser projector or also some other laser or UV-based light source, where, if necessary, a suitable arrangement is arranged to deflect a beam/beams of light obtained from the light source to project an image on the projection screen 3.

The transfer flow 2 is advantageously formed e.g. of air or water.

It is also possible to provide the device with a suction device 7, wherein the transfer flow 2 can more readily remain laminar and/or the particles, drops, or the like, operating as the scattering centres 4 can be collected preventing them from spreading/accumulating to the environment or drifting to block the path of the beam of light from the projector 6. The suction device 7 also enables reuse of the scattering centres 4.

In one embodiment of the invention the flow device 1 and the suction device 7 are connected to each other in a manner that the transfer flow 2 sucked by the suction device 7 is directed along a tube system, or the like, back to the flow device 1. A benefit of this embodiment is that while the same flow is hence recirculating in the apparatus, the disturbances caused to the surrounding area, such as turbulence caused to the surrounding area is reduced compared to a situation where the flow device 1 and/or the suction device 7 discharge the flow continuously into the surrounding space. Less disturbance directed towards the surrounding area also work in favour in keeping the transfer flow in laminar form. The scattering centres 4 contained in the transfer flow can be recycled along with the flow from the suction device 7 back to the flow device 1, or they can be removed from the flow by filtering prior to recycling the flow back to the flow device 1.

FIG. 2 depicts, in a principle manner, the apparatus according to FIG. 1 as seen from a direction opposite to the flowing direction of the transfer flow 2 (flowing direction towards an observer of the Image). FIG. 2 shows more clearly than FIG. 1 the basic idea of the invention, Le., even though some turbulence takes place in the interfaces 20 between the transfer flow 2 and Its surroundings, said turbulence does not extend disturbing effect to the laminar flow of the inner and/or central part of the transfer flow 2, where the supplied scattering centres 4 thus constitute a coherent projection screen 3.

In accordance with FIGS. 1 and 2, the laminar transfer flow 2 can be formed either by using one flow device 1, or the transfer flow 2 can be formed also in a manner shown in principle in FIG. 3 by using multiple flow devices 1 jointly. Upon using a plurality of flow devices 1, the speed, direction, composition and temperature of the transfer flows 2 caused thereby should be arranged to be as identical as possible, wherein interfaces that tend to be formed between said transfer flows 2 causing turbulence are prevented. The substantially uniform projection screen 3 that is now formed by using multiple flow devices 1 can be formed even very large, if needed.

As opposed to what is shown in the appended FIGS. 1 to 6, the transfer flow 2 and the projection screen 3 or projection volume 8 can be naturally formed to extend to any direction, for example from down to up, or vice versa, from one side to another, diagonally, or the like, by directing the flow device 1 in a suitable manner.

FIG. 4 illustrates further an embodiment of the invention where the. laminar transfer flow 2 has been arranged, by a suitable design of the structures of the flow device 1 and the supply means 5, to a curved shape in order to form a curved projection screen 3. It is naturally obvious that by the design of the structures of the flow device 1 and/or the supply means 5, it is easy to provide also other forms of non-planar flows. If necessary, the planar transfer flow 2 can be provided, using the supply means 5 that is diagonally curved in view of the flowing direction, with a curved projection screen 3 (in FIG. 4 the cross section of the flow device 1 is oblong, and the supply means is curved), and it is also possible to provide the curved transfer flow 2, using a suitable supply means 5, with a planar projection screen 3.

It is obvious to an expert in the field that multiple flow devices 1 (and possible suction devices 7) can be placed after each other in the flowing direction, wherein projection screens of an arbitrary length can be formed. In order to form different virtual spaces and rooms, a plurality of apparatuses of the invention can be installed at suitable places of the presentation space to form multiple projection screens that are separate from each other.

The particles, or the like, that operate as scattering contrast 4, can be added to the transfer flow 2, for example using carrier gas or fluid. Since the molecules or atoms of gas or fluid operate as scattering centres 4, they can be supplied in a corresponding manner to the transfer flow 2, if necessary, by means of the carrier gas or fluid.

It is also possible that the scattering centres 4 are not formed until in the actual transfer flow 2. Hence, the initial material or materials needed in the formation of the scattering centres are supplied to the transfer flow 2, where the initial material/materials react by forming scattering centres 4. For example, vapour or a mixture of vapour and air can condensate in the transfer flow 2 to water fog. The formation of the scattering centres 4 can take place also through some other applicable condensation, sublimation or chemical reaction.

The scattering centres 4 can be discharged to the transfer flow 2 from nozzles of variable forms or, for example, from a perforated or split tube, or also from another material-releasing organ or structure applicable for the present purpose. The supply means 5 that spreads the scattering centres 4 can constitute a part of the transfer flow 1 that produces the transfer flow 2, or it can constitute a separate means at a suitable position in the direction of the transfer flow 2, further away from the flow device 1 and/or diagonally in view of the direction of flow, at a suitable position of the transfer flow 2.

Using non-elastically light scattering material as the scattering centres 4, the wavelength of the radiation emitted by the scattering centres 4 differs from the wavelength of the radiation used for their activation and has longer wavelength than illuminating radiation.

When using non-elastic scattering, the image formed on the projection screen 3 is in principle monochromic, the colour being dependent on the properties of the scattering centres 4 and the wavelength of light transmitted by a projector 6 used for their activation. If the aim is to form coloured images, scattering centres 4 that are composed of multiple different materials and scatter light in different non-elastic manners must be used, a separate partial image being projected for each scattering centre 4 using a suitably selected radiation of exciting wavelength The non-elastically light-scattering scattering centres 4 can be for example phosphorescent or fluorescent particles of solid material, liquid drops, vapour or gas, and they can be illuminated by a suitable laser projector or other projector 6 that sends ultraviolet light or visible light. The light transmitted by the projector 6 now activates only desired areas on the projection screen 3, wherein only these areas emit light and form the image perceived by the observer. Thus, it is possible to obtain images of arbitrary shape that can be observed in principle from any possible angle because now also the actual images are transparent, in addition to emission of light. In other words, the light emitted by the scattering centres 4 activated by the projector 6 does not absorb to a significant degree to other scattering centres 4, because the wavelength of the emitted light differs from the light transmitted by the projector 6, and is therefore not suitable for activation of the scattering centres 4. Thus, using the method according to the invention, it is possible in this embodiment to form images, videos, or the like, of objects, people, and so forth, that appear to be floating in the air.

In projection screens 3 using elastic scattering and formed of fog, or the like, the actual projection screen tends to become always visible, at least to some extent, due to the normal lightning of the environment or other diffused illumination directed to the projection screen or scattering/reflecting therefrom. In those embodiments of the invention that are based on non-elastic scattering, the use of suitable scattering centres 4, for example gas molecules, makes it possible to arrange the projection screen 3 in the normal prevailing light of the surrounding area to be substantially transparent, in other words invisible to the observer, because the light originating from the above-mentioned light sources is not applicable for activating the scattering centres 4. This makes it possible also to form multiple projection screens 3 adjacent to each other in the direction of flow in a manner that the image formed in a certain projection screen 3 is observed through adjacent projection screens 3. By selecting the scattering centres 4 for each adjacent projection screen 3 in a manner that different wavelengths and different projectors/light sources 6 are used for their activation, it is possible to form a different image for said different projection screens 3 and thus to achieve a three-dimensional effect. By elaborating this above-mentioned principle still further three-dimensional projection volumes can be formed.

FIGS. 5 and 6 illustrate the principle of the invention upon forming a projection volume instead of a projection screen. A three-dimensional projection volume 8 is formed of the scattering centres 4 that are discharged from the supply means 5 and/or formed of source material/materials discharged from said supply means 5. The scattering centres 4 are allowed to the laminar transfer flow 2 in a plane that is diagonal in view of the direction of said flow, only to desired locations (from certain supply means 5) and only at desired moments of time. This way a three-dimensional pattern, a projection volume 8, moving along the transfer flow is obtained.

The resolution of the projection volume 8, and that of the three-dimensional pattern obtained therewith, is dependent on the quantity, size and the number density of the supply means, and the time control of the feeding of the transfer flow 2 of the scattering centres 4. If the aim is to produce a long unbroken pattern that is axial to the transfer flow, it is not necessary to carry out exact time control to the supply means 5 (e.g. opening and closing).

The projection volume 8 can be formed either transparent or non-transparent, wherein, particularly in the latter case, it is possible to project a desired image or desired surface patterns on the outer surface of the projection volume 8, if necessary. Nevertheless, It is not necessary to use surface patterns. When the projection screen 8 is transparent and when, e.g., using scattering centres 4 that are applicable to non-elastic scattering, e.g., fluorescence, the scattering centres 4 can be activated, if so desired, on the whole volume area of the projection volume 8, i.e., also inside the three-dimensional pattern formed by the projection volume 8. Hence, an illuminating volume is formed.

Because the pattern formed by means of the projection volume 8 moves along the transfer flow 2, the projector 6 can, if necessary, be arranged, to deflect the beam/beams of light obtained from the light source, to move along the pattern. Thus, for example a surface pattern projected on the outer surface of said pattern can be made to move along the pattern.

Scattering centres 4 are supplied to the transfer flow 2, preferably by means of the supply means 5, such as, e.g., nozzles arranged to matrix form and controlled by a data processing device, such as a processor unit or computer.

By means of the projection volume 8, the forms of the three-dimensional pattern to be created can be emphasized using illumination from various directions, i.e., there can be more projectors 6, if needed, arranged to illuminate the projection volume 8 from various directions.

It is obvious to anyone skilled in the art, that the projection screens 3 or volumes 8 can be used both indoors and outdoors to substitute a traditional screen or, e.g., to create preferably large or otherwise complicated projection targets. An image or pattern can be projected from different sides of the projection screen or projection volume, and the projector/light source 6 used for producing the Image or pattern does not necessarily need to be perpendicular in view of the planar projection screen. The image can, if necessary, be adjusted e.g. optically or digitally using prior art techniques.

When using air or other harmless gas for forming the transfer flow 2, and, e.g. dry dust or other risk-free materials as scattering centres 4, it is possible to bring about walk-through projection screens 3 or projection volumes 8.

Using the method and apparatus of the invention, projection targets of arbitrary form can be created. Curved planes, different points of discontinuity, and the like, can be readily brought about by means of the invention.

The method and the apparatus according to the invention can be used also for producing other surfaces and volumes than those needed for imaging projection applications. The invention can be applied for example for producing curtains or other visual obstructions or projection screens needed for different illumination purposes.

It is, of course, obvious for anyone skilled in the art that by combining, in different ways, the methods, modes of operation and device structures presented above in connection with different embodiments of the invention, it is possible to provide various embodiments of the invention in accordance with the spirit of the invention.

It is, of course, obvious for anyone skilled in the art that the appended drawings are only intended for illustration of the invention, and thus the structures and components presented therein are not drawn to scale.

What is claimed is:

1. A method for forming a non-solid projection screen or projection volume, in which method light scattering/reflecting scattering centers are supplied to and/or produced to a substantially laminar transfer flow, said light scattering/reflecting scattering centers being transferred by said transfer flow, wherein the scattering centers are supplied and/or formed to the transfer flow to the central/inner parts thereof that remain laminar, away from the direct vicinity of the interface between the transfer flow and the area surrounding thereof.

2. The method according to claim 1, wherein the transfer flow is formed of gaseous substance.

3. The method according to claim 1, wherein the transfer flow is formed of liquid substance.

4. The method according to claim 1, wherein the scattering centers comprise light elastically scattering/reflecting, solid, liquid or gaseous substance.

5. The method according to claim 1, wherein the scattering centers comprise light non-elastically scattering, solid, liquid or gaseous substance, which scattering centers are made to emit light by exciting them by an electromagnetic radiation, that has higher energy compared to said emitting light.

6. The method according to claim 5, wherein the scattering centers comprise fluorescent or phosphorescent substance.

7. The method according to claim 5, wherein the scattering centers are made to emit light by exciting them with electromagnetic radiation having a higher energy compared to the emitting light.

8. The method according to claim 1, wherein in the transfer flow the scattering centers are formed of initial materials supplied to said transfer flow by condensation, sublimation and/or chemical reaction.

9. The method according to claim 1, wherein the scattering centers are supplied and/or formed in a transversal plane relative to the direction of the transfer flow, at multiple different locations of the transfer flow.

10. The method according to claim 1, wherein the scattering centers are supplied and/or formed to the transfer flow in a method varying with time.

11. The method according to claim 1, wherein the transfer flow and/or the scattering centers included therein are collected by sucking the transfer flow and/or the scattering centers to a separate suction device.

12. The method according to claim 11, wherein the transfer flow and/or the scattering centers collected by the suction device is used in the formation of the transfer flow and/or the projection screen and/or the projection volume.

13. The method The method according to claim 1, wherein multiple projection screens and/or projection volumes are formed one after the other and/or side by side and/or one on top of the other to implement a broader projection target and/or a virtual room/space and/or virtual pattern.

14. The method according to claim 1, wherein the transfer flow is formed of air.

15. The method according to claim 1, wherein the transfer flow is formed of water.

16. An apparatus operative to provide a non-solid projection screen, projection volume, of light scattering/reflecting scattering centers flowing along a transfer flow, said apparatus comprising:

a flow device operative to form a substantially laminar transfer flow, and one or multiple supplies operative to supply the scattering centers, and/or initial materials needed in the formation thereof, to the transfer flow to central/inner parts thereof that remain laminar, away from a direct vicinity of interfaces between the transfer flow and an area surrounding thereof.

17. The apparatus according to claim 16, wherein the flow device is arranged to form the transfer flow of gaseous substance.

18. The apparatus according to claim 16, wherein the flow device is arranged to form the transfer flow of liquid substance.

19. The apparatus according to claim 16, wherein the scattering centers comprise light elastically scattering/reflecting, solid, liquid or gaseous substance.

20. The apparatus according to claim 16, wherein the scattering centers comprise light non-elastically scattering, solid, liquid or gaseous substance, which scattering centers are made to emit light by exciting them with electromagnetic radiation, that has higher energy compared to said emitting light.

21. The apparatus according to claim 20, wherein the scattering centers comprise flourescent or phosphorescent substance.

22. The apparatus according to claim 20, wherein the scattering centers are made to emit light by exciting them with ultraviolet radiation.

23. The apparatus according to claim 16, wherein one or multiple supplies are arranged to supply to the transfer flow initial material/materials for forming the scattering centers in a transfer flow of said initial material/materials through condensation, sublimation and/or chemical reaction.

24. The apparatus according to claim 16, wherein the one or more supplies is/are arranged to supply and/or form scattering centers in a plane transverse relative to the direction of the transfer flow, at multiple different locations of the transfer flow.

25. The apparatus according to claim 16, wherein the one or more supplies is/are arranged to supply and/or form scattering centers to the transfer flow in a manner varying with time.

26. The apparatus as set forth in according to claim 16, wherein the apparatus further comprises a suction device for collecting the transfer flow and/or the scattering centers comprised therein.

27. The apparatus according to claim 26, wherein the apparatus further comprises means for returning the transfer flow collected by the suction device and/or the scattering centers back to the flow device for reuse.

28. The apparatus according to claim 16, wherein the flow device is arranged to form the transfer flow of air.

29. The apparatus according to claim 16, wherein the flow device is arranged to form the transfer flow of water.

* * * * *